(12) United States Patent
Hahn

(10) Patent No.: US 9,138,845 B2
(45) Date of Patent: Sep. 22, 2015

(54) DUST EXTRACTOR

(75) Inventor: Norbert Hahn, Hunstetten-Limbach (DE)

(73) Assignee: Black & Decker Inc., Newark, DC (US)

( * ) Notice: Subject to any disclaimer, the term of this patent is extended or adjusted under 35 U.S.C. 154(b) by 885 days.

(21) Appl. No.: 13/344,117

(22) Filed: Jan. 5, 2012

(65) Prior Publication Data

US 2012/0177455 A1    Jul. 12, 2012

(30) Foreign Application Priority Data

Jan. 6, 2011  (GB) .................................. 1100118.7

(51) Int. Cl.
| | |
|---|---|
| B23B 47/34 | (2006.01) |
| B23Q 11/00 | (2006.01) |
| A47L 7/00 | (2006.01) |
| A47L 9/02 | (2006.01) |

(52) U.S. Cl.
CPC ........... *B23Q 11/0046* (2013.01); *A47L 7/0095* (2013.01); *A47L 9/02* (2013.01); *Y10T 408/44* (2015.01); *Y10T 408/50* (2015.01); *Y10T 408/554* (2015.01); *Y10T 408/96* (2013.01)

(58) Field of Classification Search
CPC .................................................. Y10T 408/554
USPC .............................. 408/67, 76, 115 R, 115 B
See application file for complete search history.

(56) References Cited

U.S. PATENT DOCUMENTS

| | | | |
|---|---|---|---|
| 2,212,679 A | 8/1940 | White | |
| 2,755,106 A | 7/1956 | Brennan | |
| 4,205,728 A | 6/1980 | Gloor | |
| 5,605,421 A * | 2/1997 | Hodgson | 408/67 |
| 6,053,674 A * | 4/2000 | Thompson | 408/67 |
| 6,145,162 A * | 11/2000 | Deutschenbaur et al. | 15/339 |
| 8,113,747 B2 * | 2/2012 | Miyanaga | 408/67 |
| 8,202,027 B2 * | 6/2012 | Katagiri et al. | 408/56 |

FOREIGN PATENT DOCUMENTS

| | | |
|---|---|---|
| DE | 202008008561 | 9/2008 |
| EP | 0938947 | 9/1999 |

* cited by examiner

*Primary Examiner* — Eric A Gates
*Assistant Examiner* — Paul M Janeski
(74) *Attorney, Agent, or Firm* — Gabriel A. Haboubi

(57) ABSTRACT

A suction cup dust extractor for a drill including a housing; a drill collar having a drill passage formed through it; a recess formed by the walls of the housing having an opening and which, in use, locates against a work piece to create a chamber; an aperture located on the housing through which air can pass; at least one first air passage formed within the housing which connects to the aperture; and at least one second air passage formed within the housing which enables air to pass from the recess to the aperture; the collar being releasably attachable to the housing, the at least one first air passage making fluid connection with the drill passage when it is attached to the housing to enable air to pass from the drill passage to the aperture.

17 Claims, 13 Drawing Sheets

DUST EXTRACTOR

BACKGROUND OF THE INVENTION

The present invention relates to a dust extractor for use with a drill, hammer drill or hammer, and in particular to a suction cup dust extractor.

U.S. Pat. No. 4,205,728 and DE202008008561 both disclose a suction cup dust extractor for a drill.

SUMMARY OF THE INVENTION

Accordingly, there is provided a suction cup dust extractor for a drill comprising:
a housing;
a drill collar having a drill passage formed through it;
a recess formed by the walls of the housing having an opening and which, in use, locates against a work piece to create a chamber;
an aperture located on the housing through which air can pass;
at least one first air passage formed within the housing which connects to the aperture; and
at least one second air passage formed within the housing which enables air to pass from the recess to the aperture;
characterized in that the collar is releasably attachable to the housing, the at least one first air passage making fluid connection with the drill passage when it is attached to the housing to enable air to pass from the drill passage to the aperture.

BRIEF DESCRIPTION OF THE DRAWINGS

Two embodiments of the invention will now be described with reference to enclosed drawings of which.

DETAILED DESCRIPTION OF THE DRAWINGS

Figure 1:
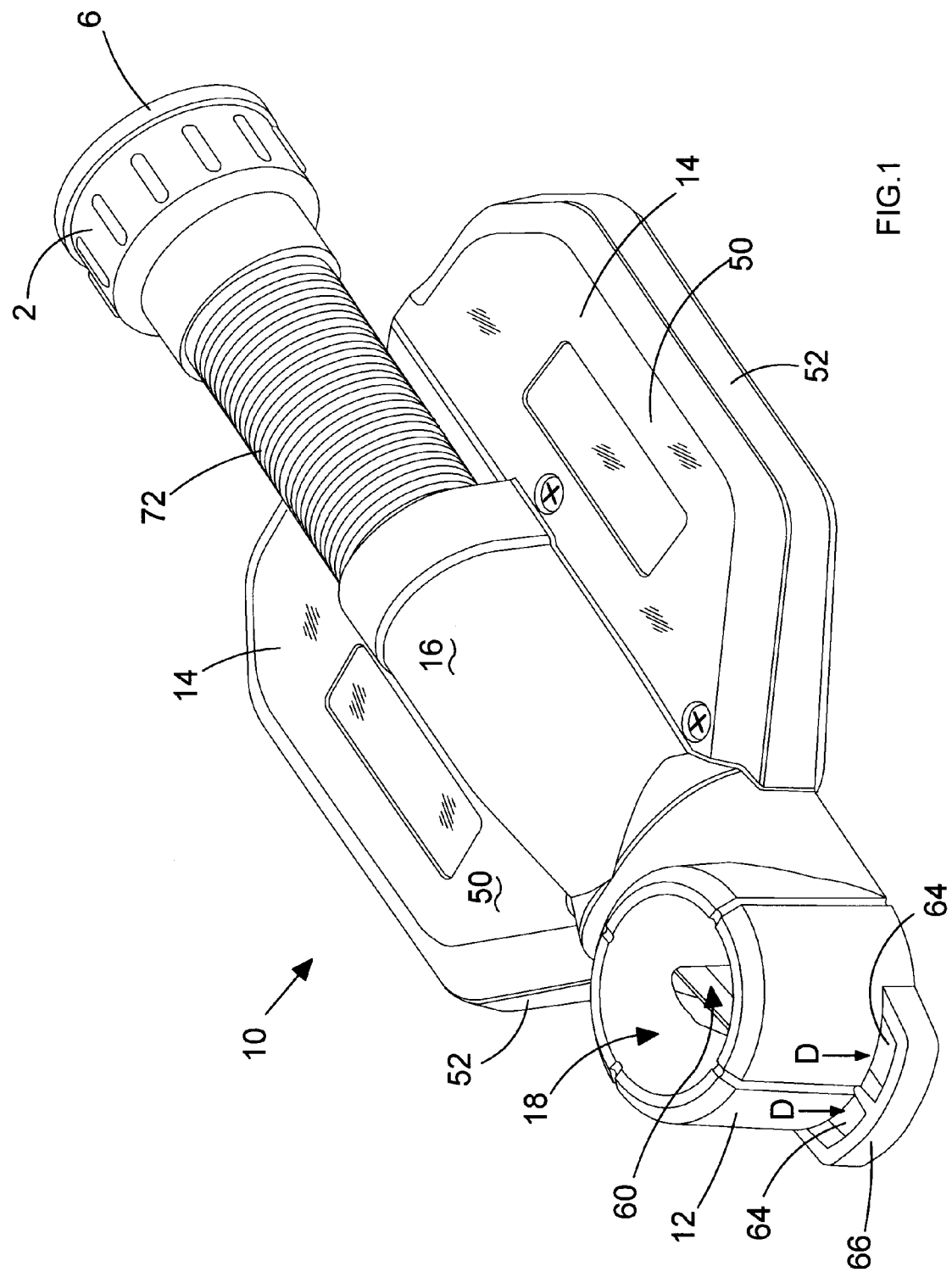
FIG. 1 shows a perspective view of the top of an example of a suction cup dust extractor.
Figure 2:
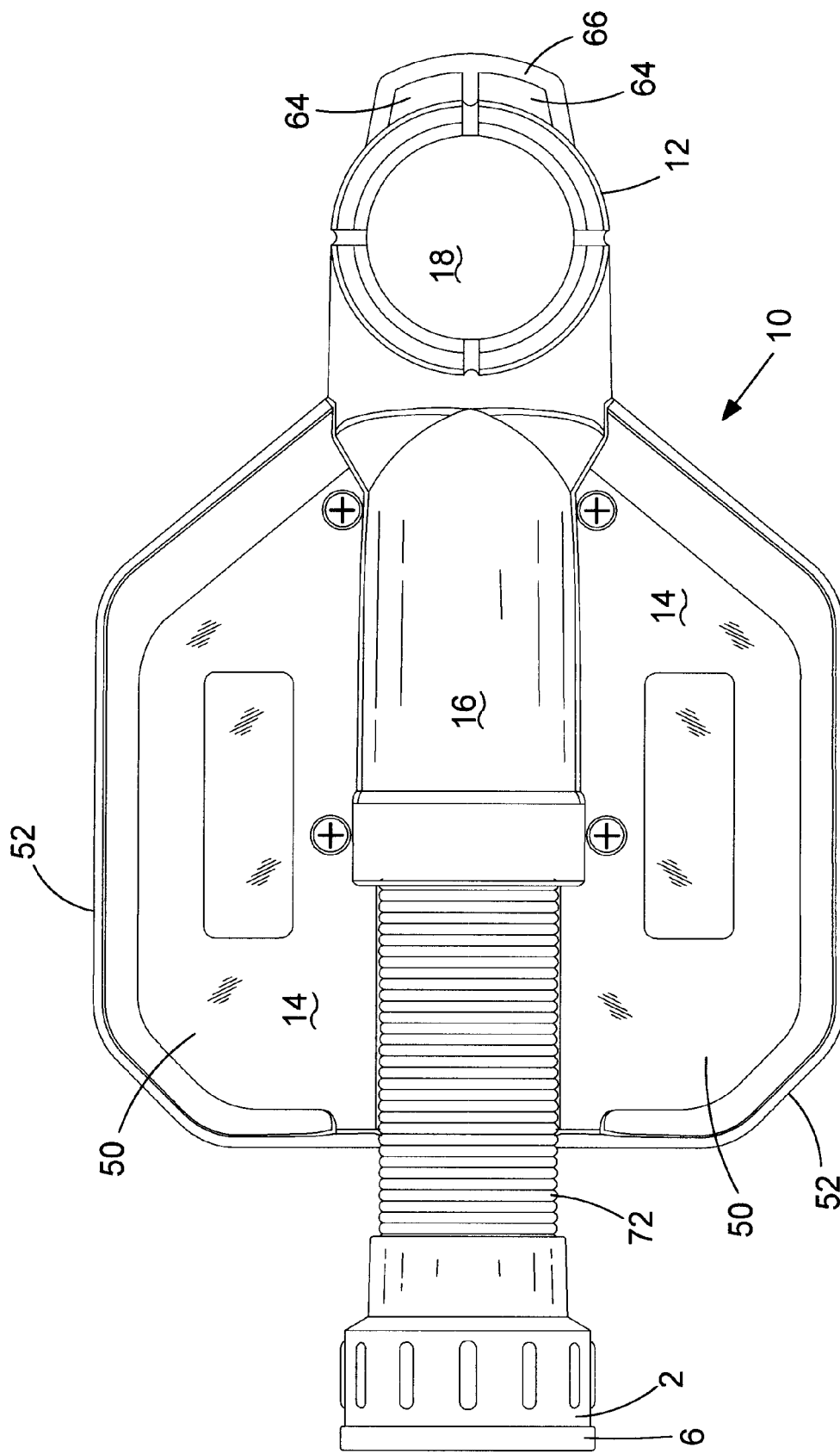
FIG. 2 shows a top view of the example of suction cup dust extractor.
Figure 3:
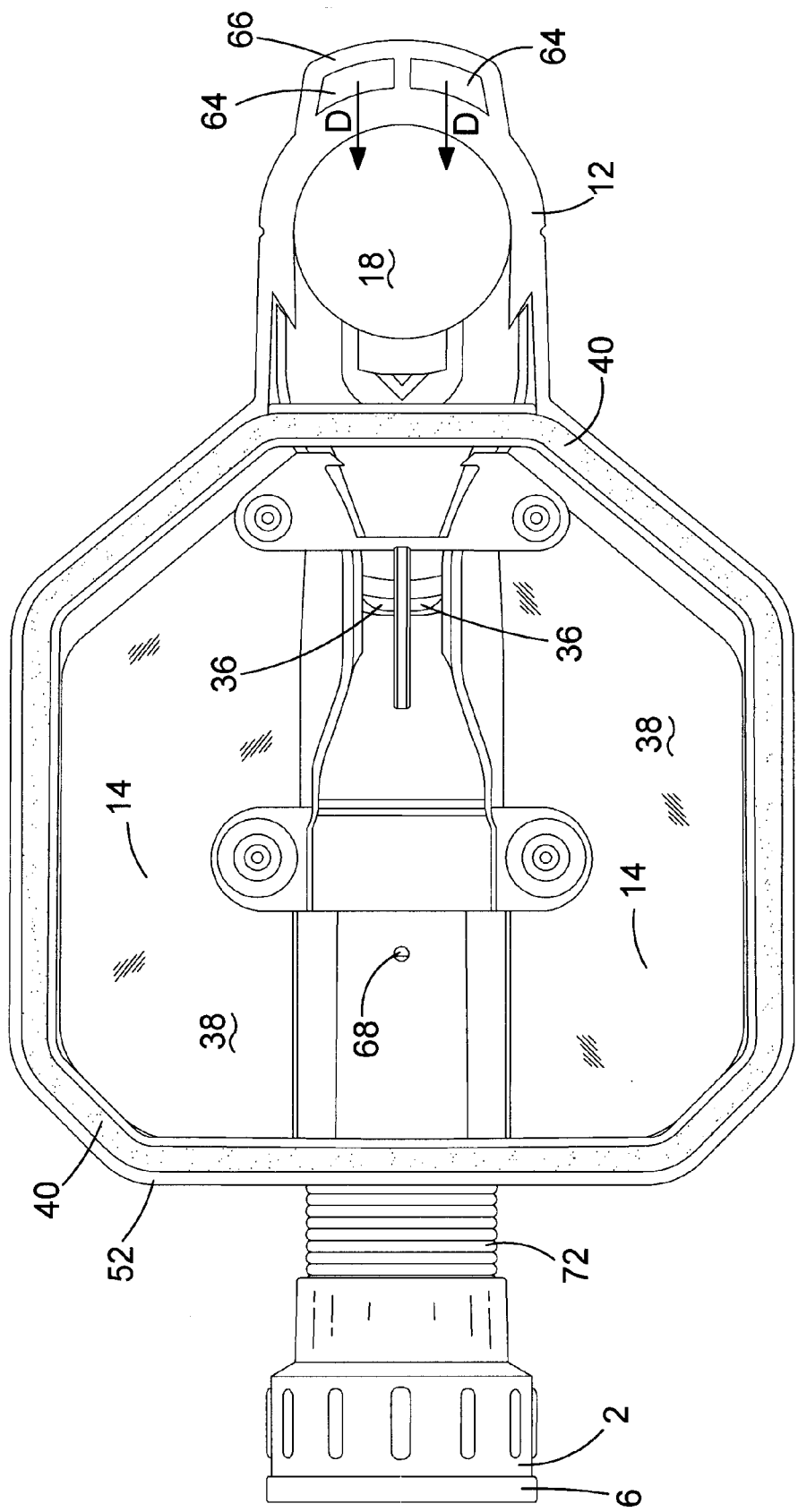
FIG. 3 shows a bottom view of the example of suction cup dust extractor.
Figure 4:
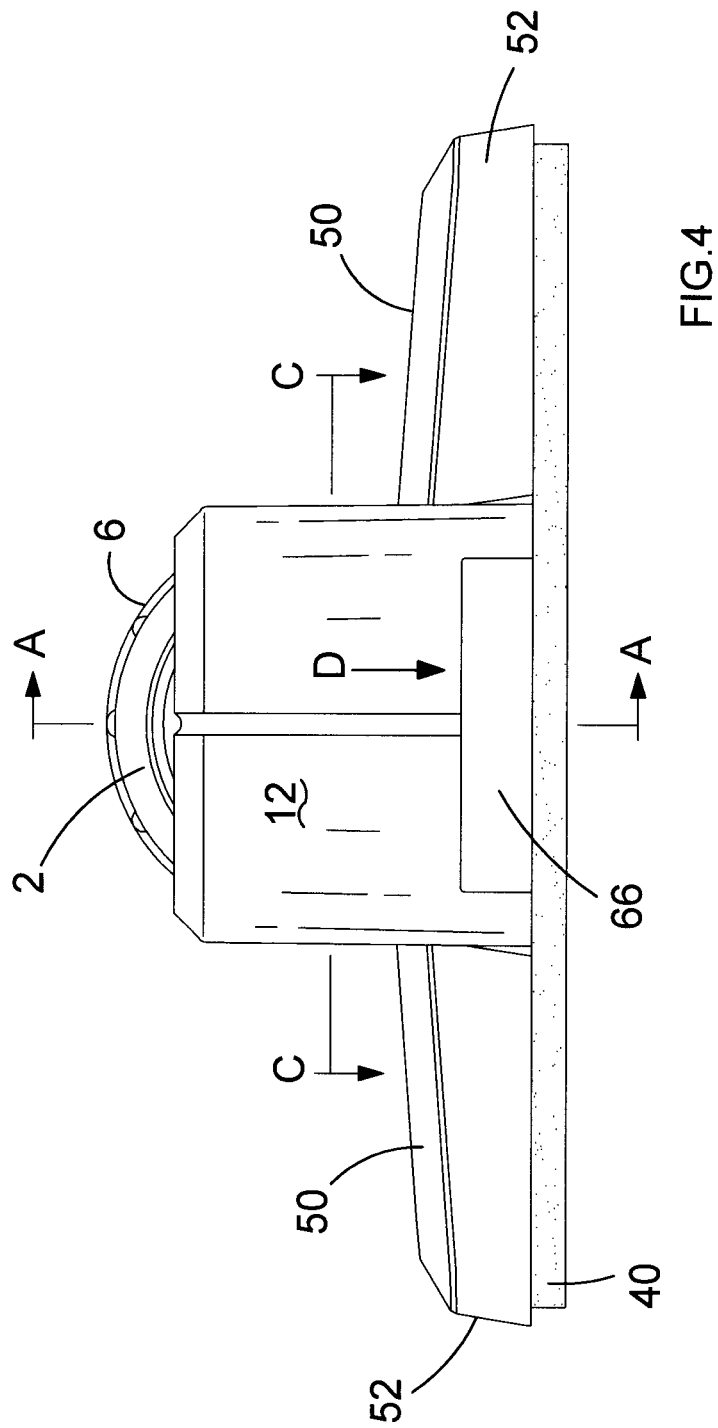
FIG. 4 shows a front view of the example of suction cup dust extractor.

An example of a suction cup dust extractor will now be described with reference to the enclosed drawings.

The suction cup dust extractor comprises a housing 10 and a drill collar 12 rigidly connected to it at the top end of the housing 10. The housing 10 comprises a skirt 14 with a bridge 16 formed on top of the skirt 14. The bridge 16 extends from the middle of the skirt 16 to the top end of the skirt 16 where it is attached to the side of the drill collar 12. The skirt 14 has a top wall 50 and side walls 52 which form a large recess 38, on the opposite side of the skirt 14 to that on which the bridge 16 is attached, which has an opening which faces away from the bridge 16.

Figure 5:
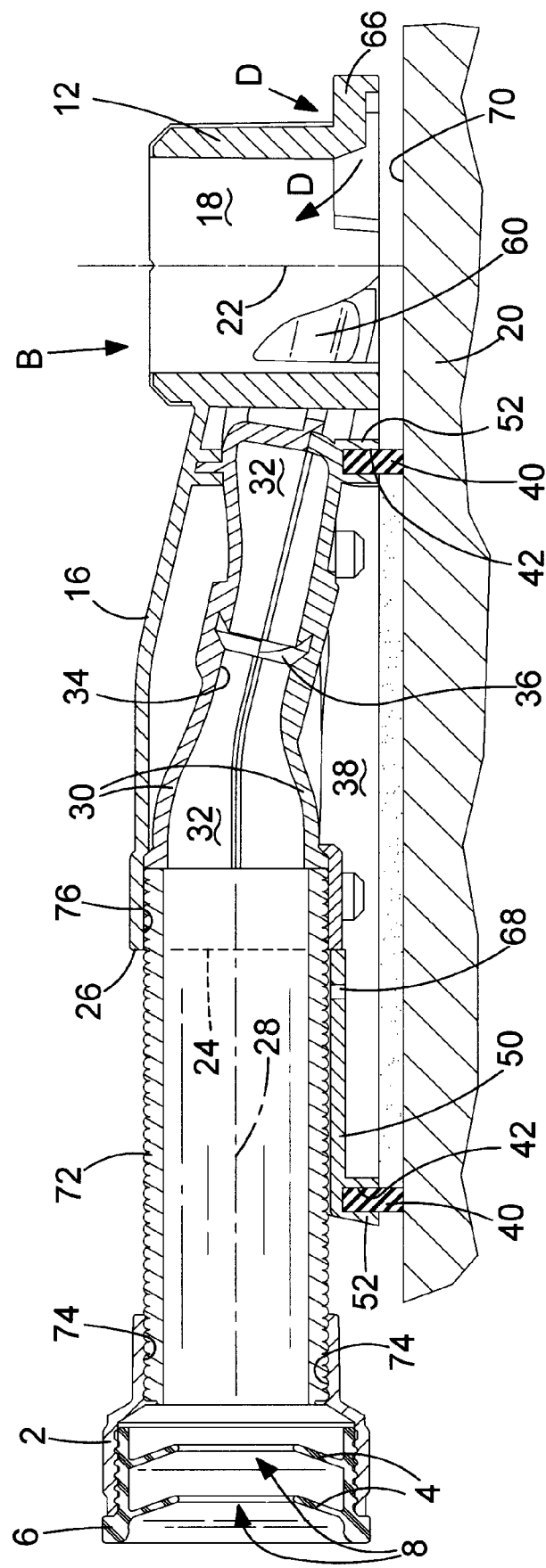
FIG. 5 shows a vertical cross sectional view of the suction cup dust extractor in the direction of Arrows A in FIG. 4.
Figure 6:
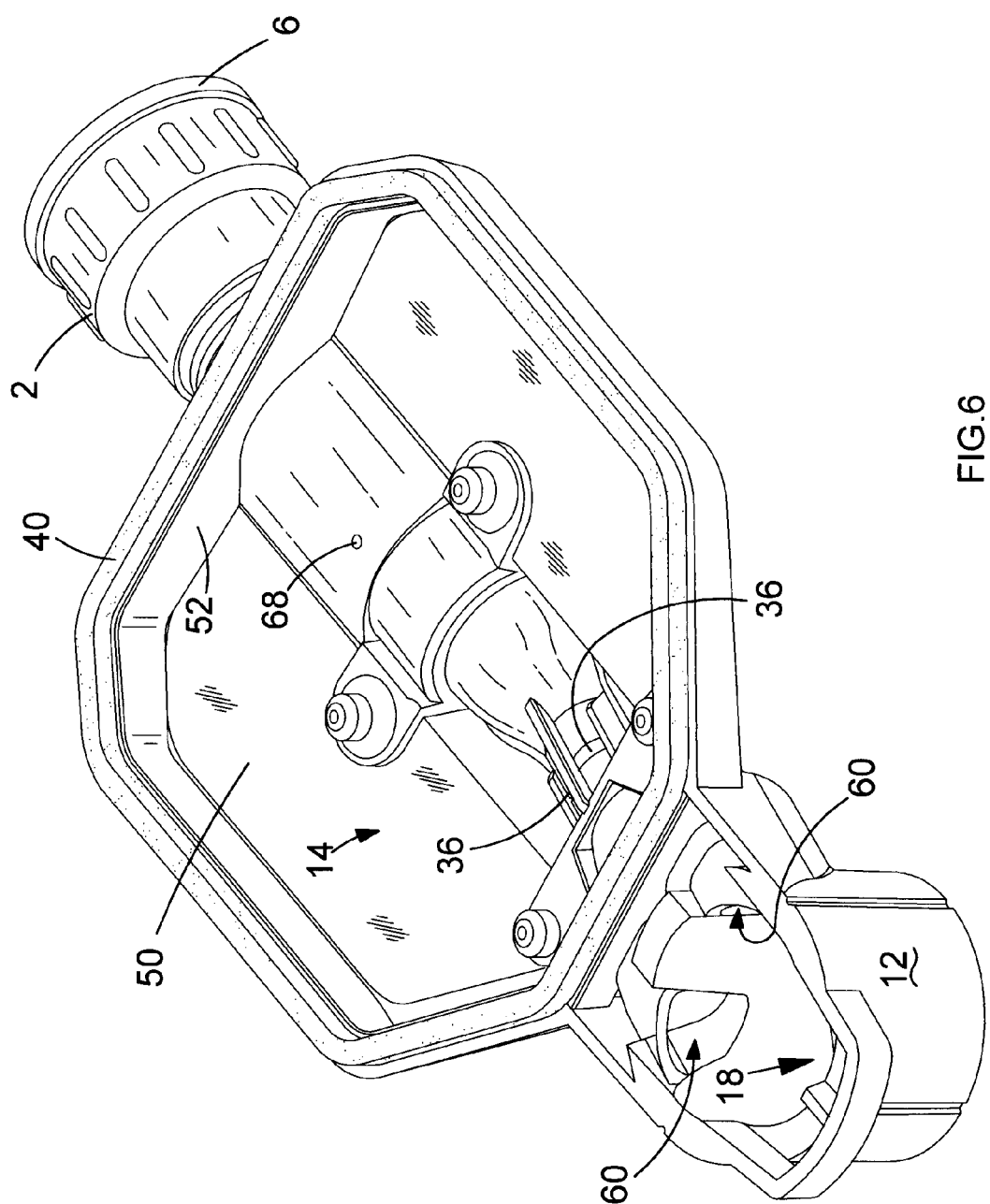
FIG. 6 shows a perspective view of the underside of the example of suction cup dust extractor.
Figure 7:
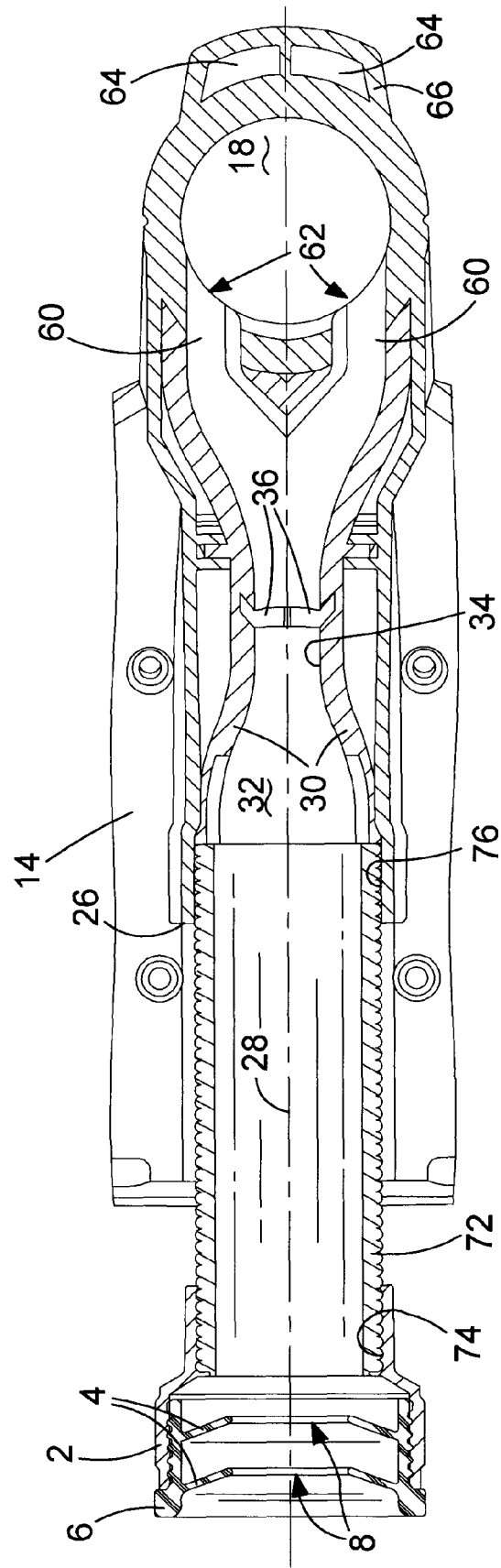
FIG. 7 shows a horizontal cross sectional view of the suction cup dust extractor in the direction of Arrows C in FIG. 4.

The drill collar 12 forms a drill passage 18 which enables a cutting tool, such as a drill bit (not shown), to pass through it (direction of Arrow B in FIG. 5) to engage a work piece 20. The drill collar 12 has a longitudinal axis 22. Both the drill passage 18 and the opening of the recess 38 are orientated in the same direction.

Formed in end 26 of the bridge 16 in the middle of the skirt 14 is an aperture 24 which provides an air exit. The aperture 24 has a longitudinal axis 28 which is perpendicular to and intersects with the longitudinal axis 22 of the drill collar 12.

Formed by internal walls 30 of the housing 10 is a first passage 32 which extends from the aperture 24 towards the drill passage 18 of the drill collar 12. Formed within the first passage 32 is a throat 34 where the diameter of the passage 32 is reduced. Two apertures 36 are formed through the wall of the passage 32 at the narrowest point of the throat 34. The apertures 36 provide a passageway from the passage 32 to the recess 38 formed by the skirt 14.

The passage 32 splits into two passages 60 between the throat 34 and the drill passage 18, each connecting with the drill passage 18 through a separate aperture 62.

An inlet air passage 64 is formed in by a frame 66 attached to the base of the drill collar 12 and operates in the same manner as that described in EP1457288. Air can pass through the inlet air passage into the drill collar 12 as shown by Arrow D.

A seal 40 locates in a groove 42 formed around the periphery of the wall of the skirt 20 on the underside of the skirt 14. When the suction cup dust extractor is placed against a work piece 20, it engages with the seal 40, the work piece 20 sealing the opening to the recess 38 to form a chamber.

An air hole 68 is provided in the wall 50 of the skirt 20 to provide a small air passage between the recess and the surrounding atmosphere. During the use of the suction cup dust extractor, the hole 68 ensures that there is a limited but constant air flow in the recess formed under the skirt 20 if the seal provides a perfect air seal with the work piece 20.

The suction cup extractor further comprises a tubular connection collar 2 which connects to a vacuum source (not shown). A rubber seal 4 is fastened inside of the connection collar 2 and which comprises two rubber rings 4 which extend radially inwards from the drill collar 12 with an aperture 8 formed through them. The rings 4 are capable of gripping onto the nozzle (not shown) of a hose (not shown) of the vacuum source. As the rings 4 are resilient, they can stretch radially outwardly, increasing the size of the apertures 8, enabling nozzles of different sizes to be used. The rings 4 would then grip the nozzle due to their resilience and frictionally hold the nozzle.

The connection collar 2 connects to the aperture 24 via a flexible tube 72. One end of the flexible tube 72 is held in a sleeve 74 formed in the connection collar 2, the other in a sleeve 76 formed in the bridge 16. The flexible tube 72 can be stretched to extend its length and move the collar 2 away from the housing 10 or be bent or twisted to allow the connection collar 2 to be moved to a range of positions relative to the aperture 24. The flexible tube 72 is made from rubber.

In use, the suction cup dust extractor is placed against a surface 70 of the work piece 20 so that the seal 40 makes contact with it. A chamber is formed when opening of the recess 38, formed by the walls 50, 52, of the skirt 14 is sealed by the surface 70 of the work piece 20. The suction device is activated and air is sucked through the connection collar 2, through the flexible tube 72, through the aperture 24, through the first passage 32, through the pair of separate passages 60, through the apertures 62 and then from the drill passage 18. As air passes through the throat 34 of the first passage 32, it speeds up, causing a reduced pressure inside of the two apertures 36 due to a venturi effect. This results in the air in the recess 38 to be sucked out through the apertures 36 and into the passage 32. This causes the skirt 14 and hence the dust extractor, to be attached to the surface 70 due to the suction. The hole 68 ensures that there is a constant flow of air from the hole 68, through the recess 38, and then through the two apertures 36. The operator can then drill a hole in the surface by passing the drill bit through the drill collar 12 and drilling into the surface 70. Any debris generated during the drilling process will be sucked up into the drill passage 18 and then into passages 60. The use of two passages provides better debris clearance. The debris is then transported through the passage 32, through the aperture 24, through the flexible tube 72 and then through the connection collar 2. The hole 68 ensures that there is always air passing through the two apertures into the passage 32, thus ensuring no debris passes into the apertures 36 or the recess 38.

Figure 8:
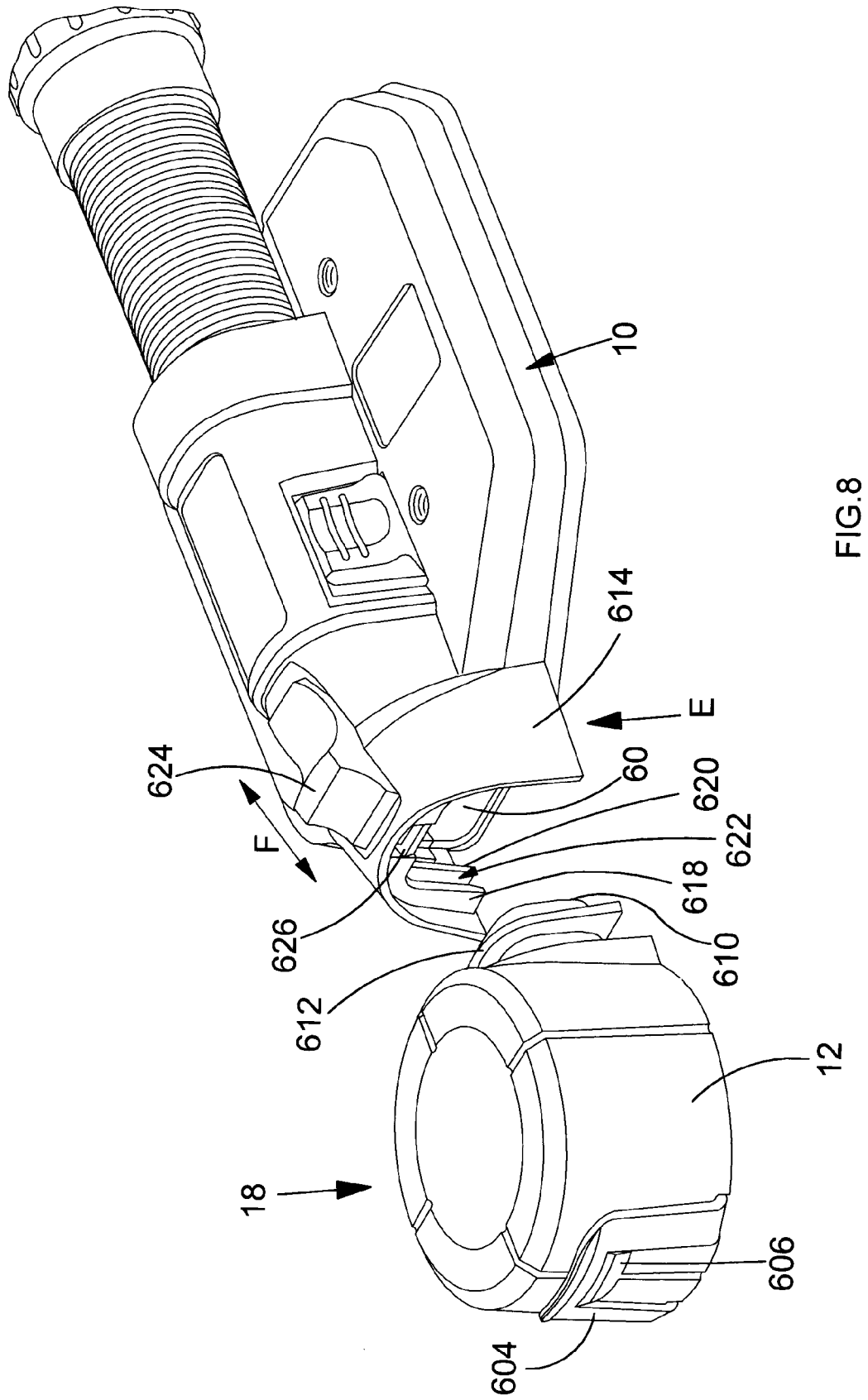
FIG. 8 shows a perspective view of an embodiment of the present invention with the collar detached.
Figure 9:
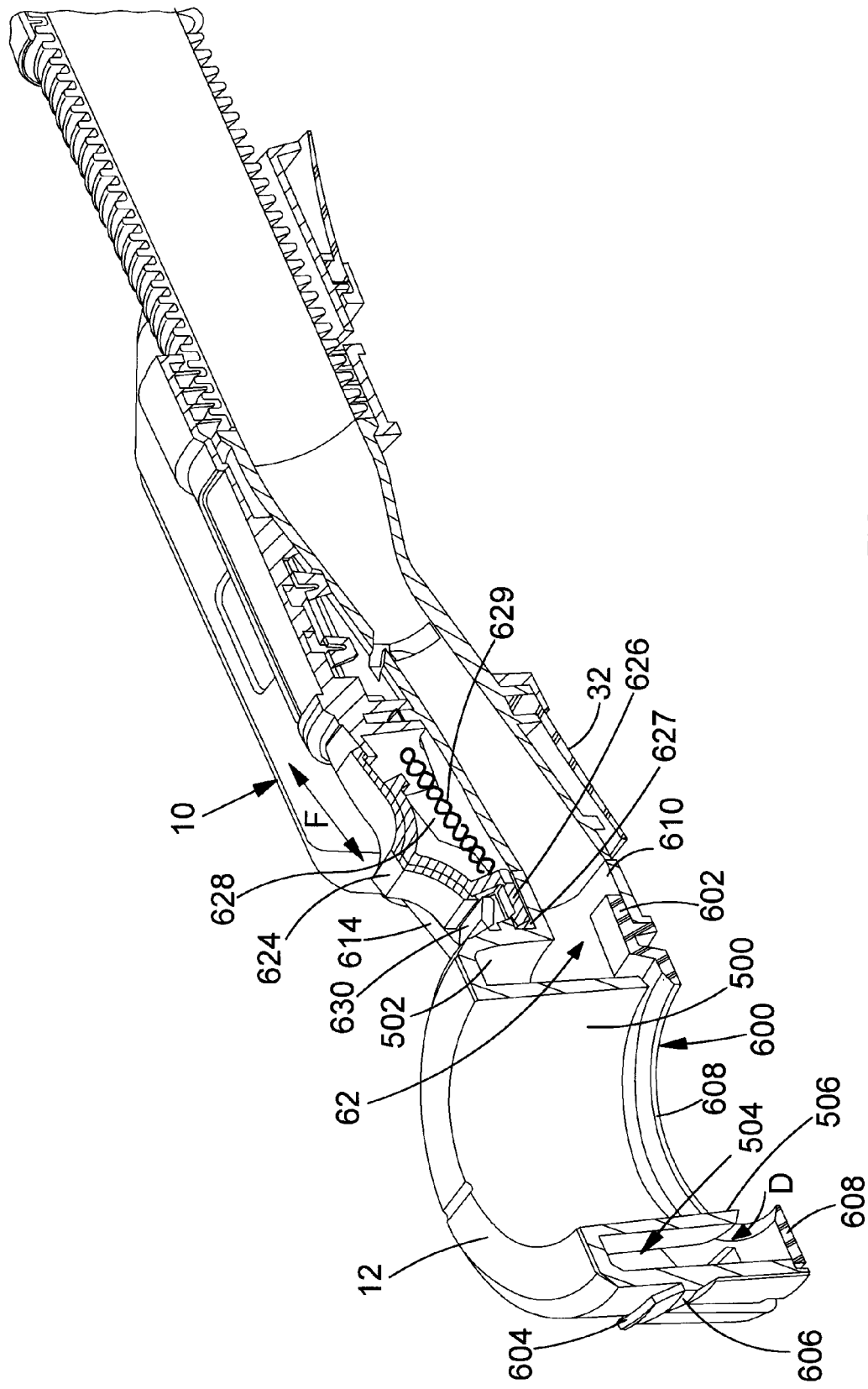
FIG. 9 shows a perspective view of a vertical cross section, with the collar attached.
Figure 10:
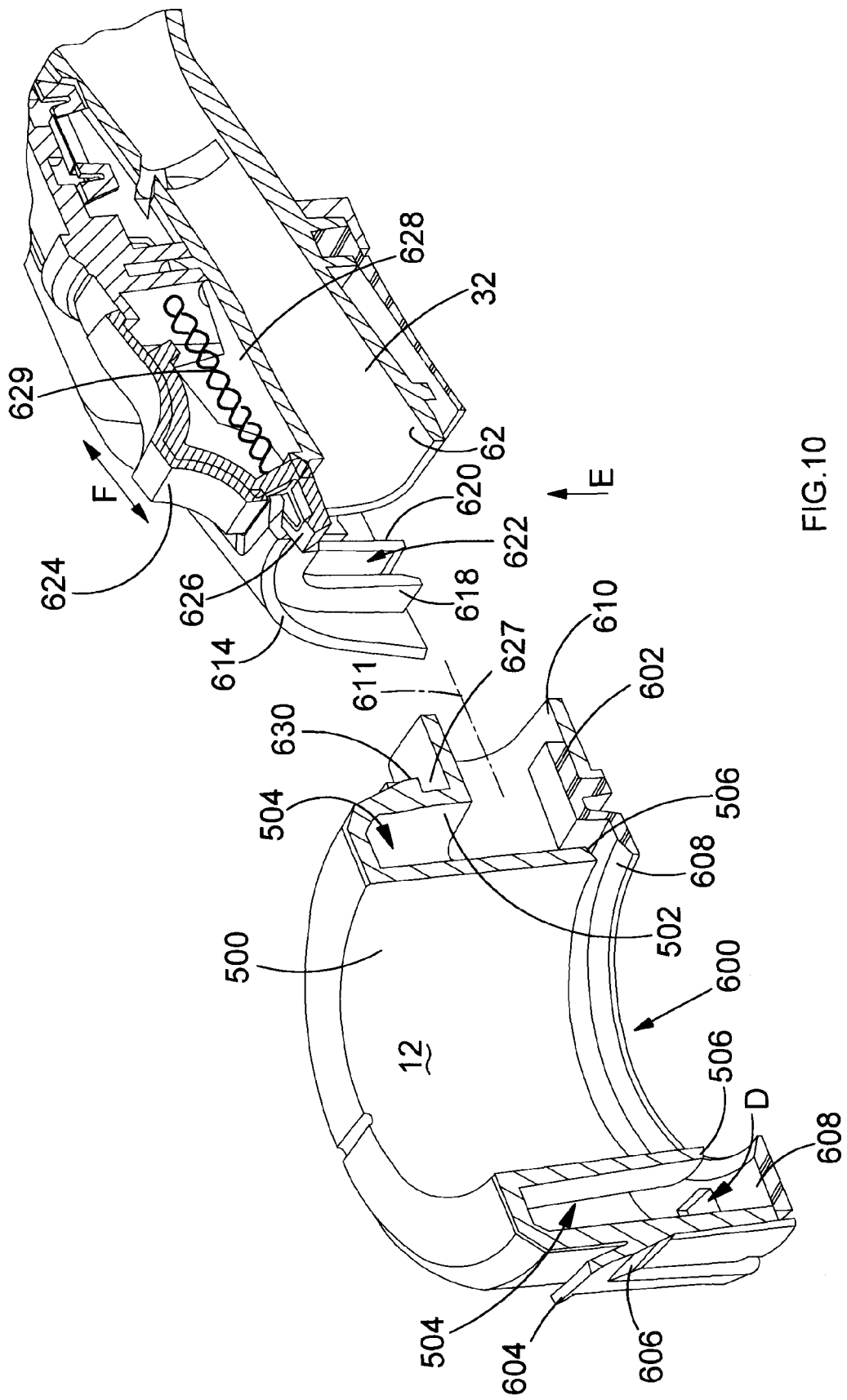
FIG. 10 shows a perspective view of a vertical cross section, with the collar detached.

A first embodiment of the present invention will be described with reference to FIGS. 8 to 10. Where the same features are present in the first embodiment that were present in the first example, the same reference numbers have been used. The design of the first embodiment is the same as for the first example except for the design of the collar and the fact that it is detachable from the housing 10.

The collar 12 comprises an inner wall 500 and an outer wall 502 with a circular passage 504 formed in between. The circular passage connects to the first passage 32 via an exit tube 610 formed on the collar 12. (The first passage no longer splits into two separate passages 60 as described in the first example above). The depth f the inner wall 500 is less than that of the outer wall 502 so that air flow around (Arrow D) the base 506 of the inner wall 500 from the drill passage 18 into the circular passage 504, prior to being drawn into the first passage 32.

In addition, there is provided a cover 600 which clips onto the under side of the collar 12 The cover 600 comprises a lip 602 on one side which is capable of being inserted into the exit tube 610. On the other side there is a catch 604. To attach the cover, the lip 602 is inserted into the exit tube 610 (as best seen in FIG. 10) and then the catch 604, which is resiliently deformable, engages with a ridge 606 formed on the outer wall of the collar 12. The cover provides a barrier 608 which faces towards and partly encloses the circular passage 504. This assists in guiding the air flow in the drill collar 12 by preventing air from below the drill collar from entering the circular passage 504 and ensuring only air and entrained debris inside the drill passage 18 enters the circular passage 504.

The collar 12 is releasably detachable. This enables collars of differing diameters to be used. They will have the same design but with different dimensions. The collar 12 is releasably detachable using a locking mechanism which will now be described.

Formed on the collar 12 is the exit tube 610 which has a longitudinal axis 611. A ridge 612 is formed on each side of the exit tube 610. A skirt 614, the under side of which having corresponding dimensions to the exit tube 610, is formed on the housing 10 of the dust extractor. Two sets of ridges 618, 620 are formed on each side of the under side of the skirt 614 which result in a groove 622 being formed on each side between them. The ridges 612 can be slid into the grooves 622 (Arrow E) so that the exit tube 610 engages with the underside of the skirt 614. The shape of the exit tube is non circular to prevent rotation of the exit tube 610 inside of the skirt, thus maintaining the orientation of the collar relative to the housing 10. This results in the collar 12 being attached to the skirt 614.

A latch mechanism holds the ridges 612 in the grooves 622. The latch mechanism comprises a slideable button 624 which can slide in the direction of Arrow F. The button comprises a projection 626. A helical spring 629 locates in the cavity 628 below the button 624 and biases the button towards the collar 12. A recess 627 is formed by protrusion 630 on the side of the collar 12. When the collar is attached to the skirt 614, the projection 626 engages the recess 627 and prevents the removal of the collar 12. In order to detach the collar, the button 624 is slid away from the collar 12, against the biasing force of the spring, disengaging the projection 626 from the recess 627. The ridges 612 can then be slid out of the grooves 622.

Figure 11:
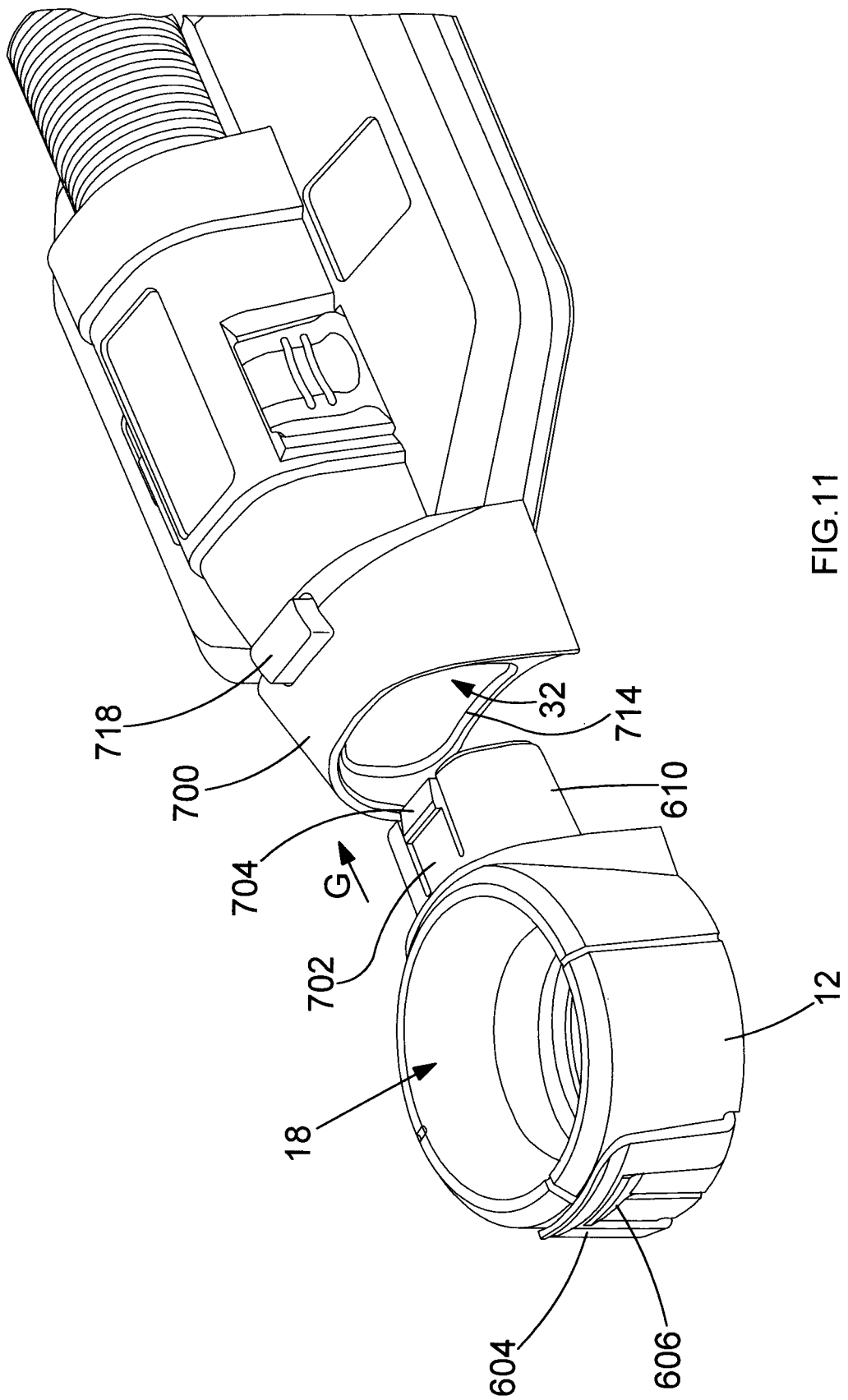
FIG. 11 shows a perspective view of the second embodiment of the present invention with collar detached.
Figure 12:
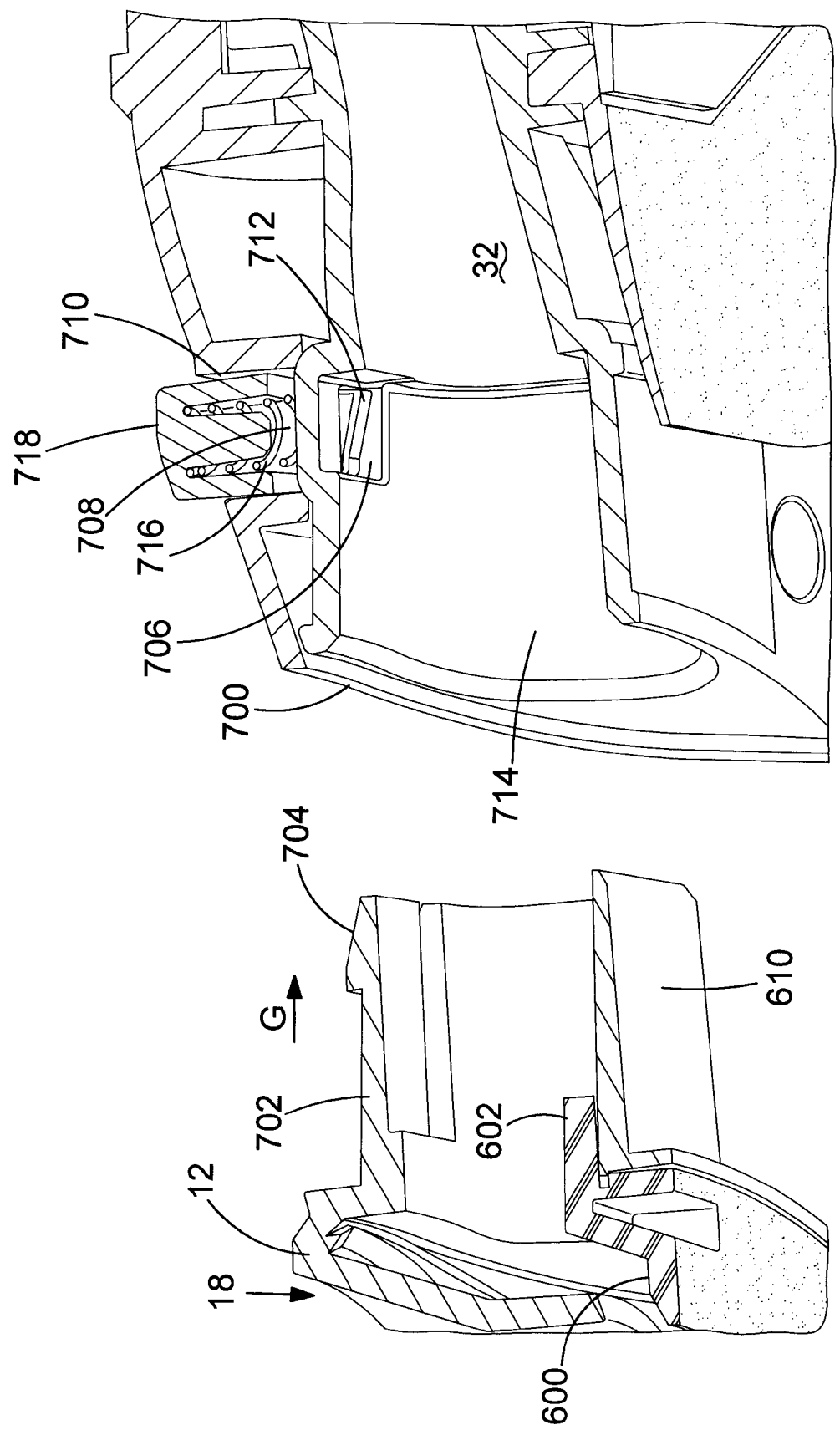
FIG. 12 shows a cross section of the connection mechanism and latch of the collar, with the collar detached.
Figure 13:
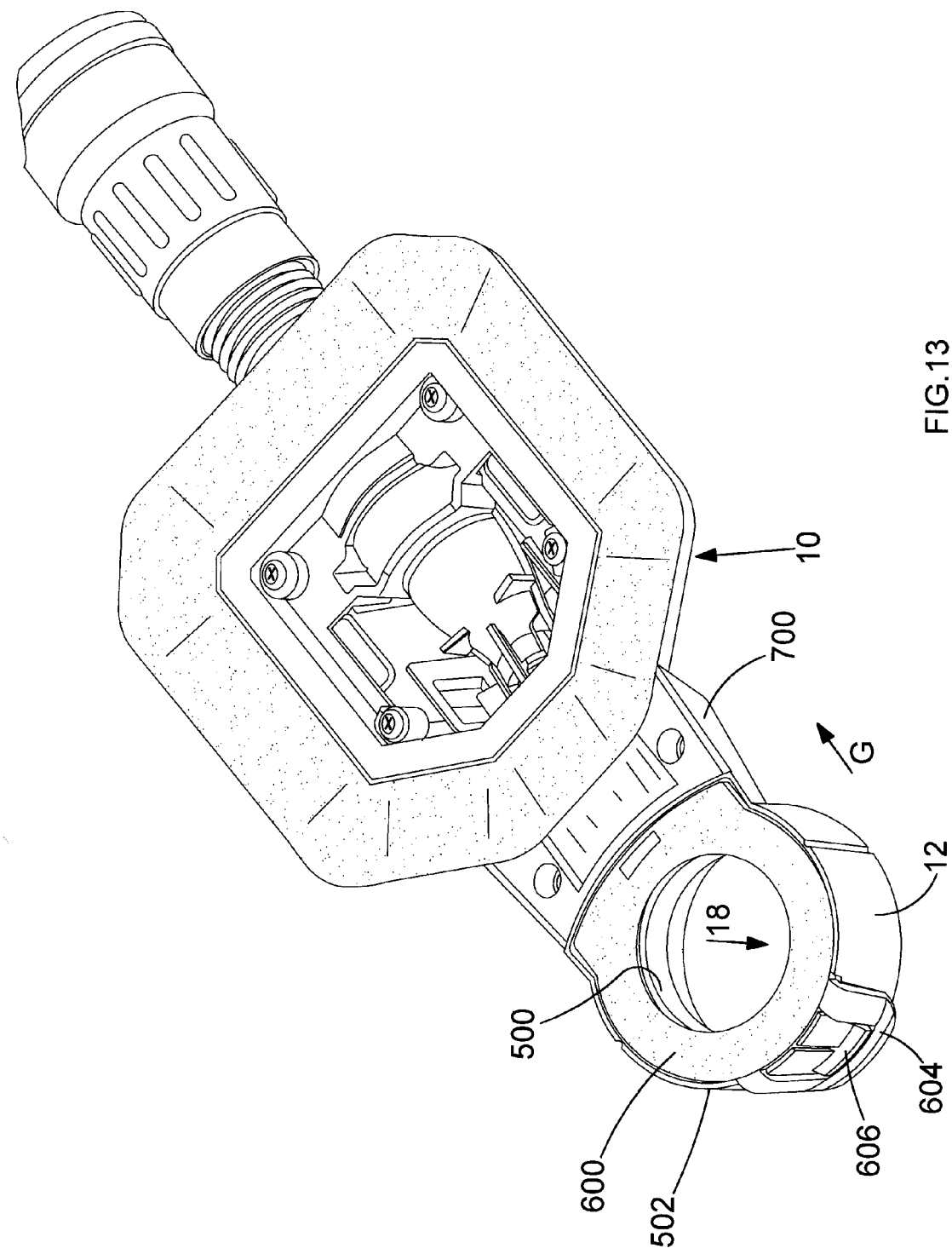
FIG. 13 shows a perspective under side view of the suction cup dust extractor with the collar attached.

A second embodiment of the present invention will be described with reference to FIGS. 11 to 13. Where the same features are present in the second embodiment that were present in the first embodiment, the same reference numbers have been used. The design of the second embodiment is the same as for the first embodiment except for the design of the locking mechanism and latch mechanism for releasably locking the collar.

The first passage 32 extends to the end of a connection section 700 formed on the housing 10 of the main part of the suction cup dust extractor. The exit tube 610 is capable of being inserted into the end of the first passage 32 (direction of Arrow G). The external dimensions of the exit tube 610 correspond to those of the internal dimensions of the first passage 32 inside of the connection section 700 to provide a close fitting connection. The cross sectional shape of the exit tube 610 is none circular to prevent the exit tube 610 from rotating within the first passage 32.

Part of the wall of the exit tube 610 is formed as a resilient arm 702 with a chamfer 704 formed at one end. An aperture 706 is formed through an internal wall of the first passage 32. A slide locking pin 708 is slideably mounted within a passageway 710 inside the housing 10 of the main section of the suction cup extractor. The passageway 710 terminates at the aperture 706. The locking pin 708 can be slid between two positions, a first where one end 712 of the locking pin 708 projects into the passageway 32 and a second where it is withdrawn from the passageway 32. The other end of the locking pin 708 is formed as a button 718 and projects externally of the housing. A helical spring 716 surrounds part of the locking pin 708 and biases it towards its second position.

When the exit tube is inserted into the end first passage, the slope of the chamfer 704 engages with the entrance 714 of the first passage 32. As the exit tube 610 continues to be pushed into the first passage 32, the entrance 714 slides up the slope of the chamfer 704, causing the resilient arm 702 to bend inwardly into the exit tube 610. Once the chamfer 704 is aligned with the aperture 706, the resilient arm 702 moves the chamfer 704 outwardly, back to its original position, the chamfer 704 moving into the aperture 706. The rear flat face of the chamfer 704 prevents the exit tube 610 from being withdrawn from the first passage 32.

In order to release the exit tube 610 from the first passage 32, the button 618 is depressed, moving the end 712 of the locking pin 708 from its second position to its first. When the end 712 of the locking pin projects into the first passage 32, the chamfer 704 is pushed out of the aperture 706, the resilient arm 702 bending inwardly as it does so. The exit tube 610 can then be slid out of the first passage 32.

Although exemplary embodiments of the present invention have been shown and described, it will be appreciated by those skilled in the art that changes may be made to these embodiments without departing from the principles and spirit of the invention, the scope of which is defined in the appended claims and their equivalents.

The invention claimed is:

1. A suction cup dust extractor for a drill comprising:
   a housing;
   a drill collar having a drill passage formed therethrough;
   a recess formed by the walls of the housing having an opening and which, in use, locates against a work piece to create a chamber that holds the housing against the work piece via suction;
   an aperture located on the housing through which air can pass;
   at least one first air passage formed within the housing which connects to the aperture; and
   at least one second air passage formed within the housing which enables air to pass from the recess to the aperture;
   wherein the collar is releasably attachable to the housing, the at least one first air passage making fluid connection with the drill passage when it is attached to the housing to enable air to pass from the drill passage to the aperture.

2. A suction cup dust extractor as claimed in claim 1, wherein the collar is releasably attached to the housing using a locking mechanism comprising a first part mounted on the collar and a second part mounted on the housing, with one of the first part and the second part comprising an exit tube which slidingly engages with a socket formed on the other of the first pa rt and the second part, the exit tube providing a fluid connection between the drill passage and the first air passage.

3. A suction cup dust extractor as claimed in claim 2, wherein one of the first part and the second part comprises a groove, and the other of the first part and the second part comprises a ribwhich slidingly engages with the groove.

4. A suction cup dust extractor as claimed in claim 2, wherein the shape of the exit tube and socket are non circular to prevent rotation of the exit tube within the socket.

5. A suction cup dust extractor as claimed in claim 2, wherein the exit tube is mounted on the collar and the socket is formed by the end the first passage, the exit tube slidingly engaging with the socket in a direction either perpendicular to or parallel to the longitudinal axis of the exit tube.

6. A suction cup dust extractor as claimed in claim 2, wherein the collar is releasably attached to housing using a latching mechanism comprising a first part mounted on the collar and a second part mounted on the housing, with one of the first part and the second part comprising a latch, and the other of the first part and the second part comprising a catch which is capable of engaging with the latch to lock the collar to the housing.

7. A suction cup dust extractor as claimed in claim 6, wherein one or more of the catch or latch is moveable.

8. A suction cup dust extractor as claimed in claim 7, wherein the catch is movable, and the moveable catch is connected to a slideable button, the sliding movement of the button moving the catch into or out of engagement with the latch.

9. A suction cup dust extractor as claimed in claim 6, wherein there is provided a moveable locking pin which is capable of moving latch into or out of engagement with the catch.

10. A suction cup dust extractor as claimed in claim 6, wherein the latch comprises a resilient arm mounted at one end to the collar, with a chamfer formed at the other free end, the latch comprising an aperture formed within the housing.

11. A suction cup dust extractor as claimed in claim 1, wherein the chamber is spaced from the drill collar relative to the work piece when the collar is attached to the housing and the dust extractor is located against the work piece.

12. A suction cup dust extractor for a drill comprising:
    a housing;
    a drill collar having a drill passage formed therethrough;
    a recess formed by the walls of the housing having an opening and which, in use, locates against a work piece to create a chamber;
    an aperture located on the housing through which air can pass;
    at least one first air passage formed within the housing which connects to the aperture; and
    at least one second air passage formed within the housing which enables air to pass from the recess to the aperture;
    wherein the collar is releasably attachable to the housing, the at least one first air passage making fluid connection with the drill passage when it is attached to the housing to enable air to pass from the drill passage to the aperture;
    wherein the collar is releasably attached to the housing using a locking mechanism comprising a first part mounted on the collar and a second part mounted on the housing, with one of the first pa rt and the second part comprising an exit tube which slidingly engages with a socket formed on the other of the first part and the second part, the exit tube providing a fluid connection between the drill passage and the first air passage; and
    wherein the exit tube is mounted on the collar and the socket is formed by the end the first passage, the exit tube slidingly engaging with the socket.

13. A drill collar for a suction cup dust extractor for a drill comprising:
    wherein the dust extractor comprises:
      a housing;
      a recess formed by the walls of the housing having an opening and which, in use, locates against a work piece to create a chamber that holds the housing against the work piece via suction;
      an aperture located on the housing through which air can pass;
      at least one first air passage formed within the housing which connects to the aperture;
      at least one second air passage formed within the housing which enables air to pass from the recess to the aperture; and
      a socket;
    the drill collar comprising:
      a drill passage; and
      an exit tube which is in fluid connection to the drill passage and which is capable of releasably connecting to the socket of a suction cup dust extractor to provide a fluid connection between the drill passage and a first air passage of a suction cup dust extractor.

14. A drill collar as claimed in claim 13, wherein the exit tube comprises a rib capable of engaging a groove in a socket of a suction cup dust extractor.

15. A drill collar as claimed in claims 13, wherein the shape of the exit tube is non circular in cross section.

16. A drill collar as claimed in claim 13, wherein there is further provided a resilient arm mounted at one end to the exit tube, with a chamfer formed at the other free end.

17. A suction cup dust extractor as claimed in claim 13, wherein the chamber is spaced from the drill collar relative to the work piece when the collar is attached to the housing and the dust extractor is located against the work piece.

\* \* \* \* \*